R. W. DOUGLAS.
COUPLING FOR ROPES, &c.
APPLICATION FILED JUNE 11, 1913.

1,087,738.

Patented Feb. 17, 1914.

Witnesses
Fenton S. Belt
Donald N. Rich

Inventor
Raiford W. Douglas

By Dowell & Dowell
Attorneys.

COLUMBIA PLANOGRAPH CO., WASHINGTON, D. C.

UNITED STATES PATENT OFFICE.

RAIFORD W. DOUGLAS, OF MIAMI, FLORIDA.

COUPLING FOR ROPES, &c.

1,087,738.  Specification of Letters Patent.  Patented Feb. 17, 1914.

Application filed June 11, 1913. Serial No. 773,039.

*To all whom it may concern:*

Be it known that I, RAIFORD W. DOUGLAS, of Miami, in the county of Dade and State of Florida, have invented certain new and useful Improvements in Couplings for Ropes, &c.; and I hereby declare that the following is a full, clear, and exact description thereof, reference being had to the accompanying drawings, which form part of this specification.

This invention is a novel device for coupling cables, ropes, cords, and the like, and is especially designed for use in connecting the cables of cash-carrying apparatus; and its object is to provide a coupling which can be easily and securely attached to the ends of the cable to be connected and will flexibly unite these ends; will also prevent the ends of the cable unraveling; will practically not increase the diameter of the cable at the coupling point; and will permit the cable to follow curves or traverse around pulleys or guides easily and practically noiselessly.

In the accompanying drawings I have illustrated one practical embodiment of the invention and mode of using the same, and will describe the invention with reference to said drawings, and in the claims summarize the essentials and the novel details of construction, of the coupling which I desire to protect.

Figure 1:
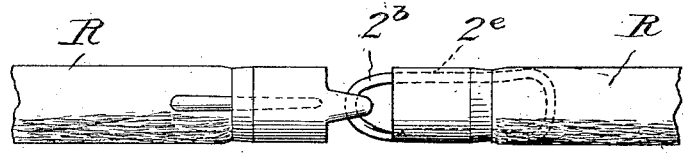
Figure 2:
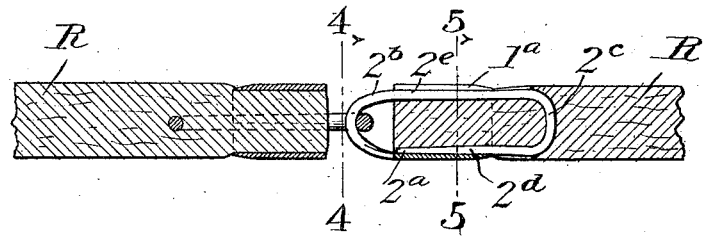
Figure 3:
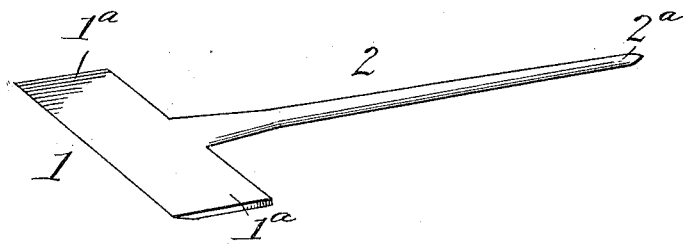
Figure 4:
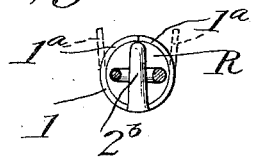
Figure 5:
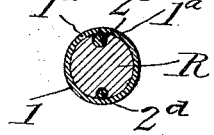

In said drawings—Figure 1 is an enlarged side view of the complete coupling uniting the adjacent ends of a rope or cable. Fig. 2 is an enlarged vertical section through such coupling. Fig. 3 is a view of one of the coupling blanks before bending. Fig. 4 is a transverse section on line 4—4, Fig. 2. Fig. 5 is a section on line 5—5, Fig. 2.

The complete coupling embodies two similar members attached to the adjacent ends of the rope or cable which is to be connected thereby. Each member is preferably composed of a body portion adapted to clamp the cable end, and a tang portion which is adapted to form both a connection between such member and the adjacent member, and also a means for securely fastening the body portion 2 to the cable end.

Fig. 3 shows a member-blank prior to bending. As shown therein the member has a body portion 1 which is substantially rectangular and is adapted to be bent into cylindric form around the end of the cable and clamp the latter as shown in Fig. 1; and from one edge of this body portion projects a shank or tang 2 which is long and narrow as compared with the body portion and is preferably pointed at its extremity $2^a$. When such a member is applied to a cable end, the body portion 1 is bent into U-shape as indicated in Fig. 4 and the tang 2 is bent backward upon itself forming a return bend $2^b$ at the outer end of the clamp member, and the tang then extends back over the end of the cable and between the ends of the body portion and is again bent downwardly at right angles and passes through the body of the cable R, as indicated at $2^c$ Fig. 2; then the portion of the tang which projects through the rope in rear of the body portion 1, Fig. 2, is bent over at right angles toward the body and lengthwise of the cable and extends between the body and cable as indicated at $2^d$ Fig. 2, the end of the shank being concealed and protected by the body when the body portion is clamped around the cable end.

The sides $1^a$ of the U-shaped blank are closed upon and around the cable end and over the underlying part $2^e$ of the shank, see Fig. 2, thus tightly clamping the member to the cable end and forming a band or thimble around such end which prevents the cable end unraveling. The member is thus securely attached to the cable end, and the body forms a cylindric thimble on the end of the cable practically of the same external diameter as the cable or rope, and is securely held against longitudinal movement on the cable by the part $2^c$ of the tang transfixing the cable in rear of such thimble; and the point $2^d$ being confined within the body gives additional security and strength to the device as the tang being so held is kept from loosening under strain, and the point is prevented from catching on any external objects. The front and rear edges of the body may be exteriorly tapered as shown so that there will be no projecting edges or shoulders to catch on the guides or pulleys over which the cable travels.

The portion $2^b$ of the shank is preferably round or cylindric in cross section, so that when it is engaged by the similar part $2^b$ of the adjacent clamp member, as indicated in Fig. 1, such parts will not cut each other and will have a free adjustment or play in relation to each other sufficient to enable the coupling to easily follow the curvature of the guides or pulleys over which the cable may be led.

Similar clamp members are similarly attached to the cable ends to be connected; but, in order to make the coupling, after one member is attached to one cable end, the other cable end is brought into proximity thereto and when it is ready to attach the other coupling member to said cable end, the shank of the latter member is inserted through the loop 2$^b$ of the member attached to the other cable end, before the second coupling member is attached to its cable end, so that when both members are attached to the ends, the coupling is completed and the cable ends are securely but flexibly united, as indicated in Fig. 1.

What I claim is:

1. In combination with a cable, a coupling member having a body portion adapted to be clamped around the cable end, and a tang projecting from the front end of such body portion and bent backward through the body portion and transfixing the cable in rear of the body portion, substantially as described.

2. In combination a cable, and a coupling member having a body portion clamped around the cable end, and a tang projecting from the front end of the body portion and bent back upon the cable and extending through the body portion and transfixing the cable in rear of the body and then bent forwardly and extending within the body portion.

In testimony that I claim the foregoing as my own, I affix my signature in presence of two witnesses.

RAIFORD W. DOUGLAS.

Witnesses:
 FRANCES BUDY,
 E. B. DOUGLAS.

---

Copies of this patent may be obtained for five cents each, by addressing the "Commissioner of Patents, Washington, D. C."